United States Patent [19]

Knapp et al.

[11] 4,026,361

[45] May 31, 1977

[54] TREATING WELLS WITH A TEMPORARILY THICKENING CELLULOSE ETHER SOLUTION

[75] Inventors: Randolph H. Knapp; Edwin A. Richardson, both of Houston, Tex.

[73] Assignee: Shell Oil Company, Houston, Tex.

[22] Filed: June 14, 1976

[21] Appl. No.: 695,896

[52] U.S. Cl. .............................. 166/281; 166/294
[51] Int. Cl.$^2$ ................ E21B 33/138; E21B 43/26
[58] Field of Search ........... 166/307, 308, 281–283, 166/294, 295, 300, 250

[56] References Cited

UNITED STATES PATENTS

| | | | |
|---|---|---|---|
| 3,353,604 | 11/1967 | Gibson et al. | 166/281 X |
| 3,378,070 | 4/1968 | Wessler et al. | 166/294 X |
| 3,719,228 | 3/1973 | Carcia | 166/281 |
| 3,795,276 | 3/1974 | Eilers et al. | 166/295 |
| 3,868,996 | 3/1975 | Lybarger et al. | 166/307 X |
| 3,889,753 | 6/1975 | Richardson | 166/300 X |
| 3,892,275 | 7/1975 | Lybarger et al. | 166/300 |
| 3,926,258 | 12/1975 | Hessert et al. | 166/294 |

Primary Examiner—Stephen J. Novosad

[57] ABSTRACT

In well treatments such as workovers, fracturing processes, etc., permeable subterranean earth formations are temporarily plugged by contacting them with self thickening-and-thinning liquid systems. The systems initially contain unhydrated cellulose ether dispersed in aqueous liquid solutions of buffering agents, pH-increasing reactants and pH-decreasing reactants. The system components are arranged so that the cellulose ether hydration is first delayed by a buffer-maintained acidity, then is accelerated by an increasing pH and, subsequently, the high viscosity due to the dissolved hydrated cellulose ether is reduced by an acid-induced hydrolysis of the ether.

9 Claims, No Drawings

TREATING WELLS WITH A TEMPORARILY THICKENING CELLULOSE ETHER SOLUTION

BACKGROUND OF THE INVENTION

The invention relates to well treatments involving temporarily decreasing the permeabilities of subterranean earth formations.

Various process, such as working over a well, diverting injected fluids, extending and/or acidizing a fracture, or the like, can be facilitated by temporarily plugging permeable subterranean earth formations. U.S. Pat. Nos. 3,615,794 and 3,766,984 describe compositions and procedures for effecting such temporary pluggings by injecting significantly basic aqueous suspensions of a galactomannan which has been treated to delay the rate of its hydration, a buffering agent, and a cross-linking and hydrating agent for temporarily gelling the gum. Those patents mention several difficulties which are involved in using such cross-linked gums and indicate that the patented processes avoid various difficulties; other than those due to the tendency for such cross-linked gums to fail to break down to provide a low viscosity within a selected period of time.

SUMMARY OF THE INVENTION

This invention relates to a process for temporarily plugging a subterranean earth formation in or around the borehole of a well. An aqueous solution is buffered so that it remains significantly acidic while a selected amount of hydroxyl ions are being added to the solution. A compound which reacts to gradually yield enough hydroxyl ions to overcome the buffering and make the solution at least slightly alkaline, is dissolved in the solution. A reactive compound that reacts more slowly than the hydroxyl-ion-yielding compound and subsequently yields enough hydrogen ions to overcome the alkalinity provided by the hydroxyl-ion-yielding compound and make the solution significantly acidic, is dissolved in the solution. An unhydrated cellulose ether which hydrates relatively slowly in a significantly acidic aqueous solution but hydrates relatively quickly in a substantially neutral or alkaline aqueous solution and, when hydrated, dissolves to materially increase the viscosity of an aqueous solution, is dissolved in the aqueous solution. The compositions and concentrations of those components are adjusted relative to (a) the time-temperature exposure of fluid flowed into contact with the subterranean earth formation to be plugged and (b) the extent and duration of the viscosity selected for the material that plugs the earth formation. The aqueous liquid is then flowed into contact with the subterranean earth formation and kept there while the solution viscosity has the selected magnitude for the selected time.

DESCRIPTION OF THE INVENTION

The present invention, at least in part, premised on the following discovery. In an aqueous liquid system, (a) the increase with increasing pH and temperature of the rate at which a dispersed unhydrated cellulose ether becomes hydrated (so that it dissolves and increases the viscosity of the resulting solution), (b) the increase with decreasing pH of the rate at which a dissolved hydrated cellulose ether becomes hydrolyzed (so that the solution viscosity is reduced) and, (c) the increases with increasing temperature of the rates at which the pH of an aqueous liquid solution can be increased or decreased by the reaction of dissolved compounds are such that, for the time-temperature exposures of fluid flowed into contact with subsurface earth formations and the high viscosities and durations of high viscosities needed for temporarily plugging such earth formations, the compositions and concentrations of such components of an aqueous liquid system can be arranged to provide temporary plugs suitable for well treating operations. And, the acid-induced hydrolysis of a cellulose ether water-thickening agent provides a relatively reliable and complete viscosity decrease (to provide a substantially water-like viscosity) within a relatively accurately predictable time at a given temperature.

Aqueous liquids suitable for use in the present process can comprise substantially any relatively soft and relatively salt-free natural water or water treated water. Total dissolved solid contents of less than 100,000 ppm are generally suitable. Such aqueous liquids preferably have total dissolved solid contents of less than 10,000 ppm with multivalent ion contents of less than about 1,000 parts per million (based on calcium ion equivalency).

Cellulose ethers suitable for use in the present invention can be substantially any which (a) in unhydrated form, can be homogeneously dispersed throughout a significantly acidic aqueous liquid (preferably having a pH of from about 2 to 6) in the form of finely divided particles (preferably having average diameters of not more than about 5 microns and preferably not more than about 1 micron) and (b), in hydrated form, are sufficiently soluble and effective in increasing the viscosity of aqueous liquid solutions to provide thickened solutions having viscosities of at least about 2,000 centipoises at temperatures such as about 100° F. Examples of such cellulose ethers include hydroxyethylcellulose, carboxymethylcellulose, methylcellulose, and the like. The hydroxyethylcelluloses are preferred and are available, from Hercules Powder Company as Natrasols, from Dowell as J-164, and from Halliburton as WG-8. The Hercules Powder Natrasol R-grade hydroxyethylcellulose is a particularly preferred hydroxyethylcellulose which, at temperatures ranging from about 40° to 95° F., exhibits (a) a relatively significantly delayed rate of hydration in an aqueous liquid having a pH of from about 4 to 5 and (b) a relatively rapid rate of hydration in an aqueous liquid having a pH of from about 7 to 10.

Buffering systems suitable for use in the present invention can comprise substantially any water-soluble buffers for maintaining a pH of from about 2 to 6 (and preferably from about 4 to 5) while a significant amount of hydroxyl ions are being added to the solution. Examples of such buffers include monopotassium dihydrogen citrate, equal molar mixtures of acetic acid and sodium acetate, equal-molar mixtures of potassium acidthallate and sodium acetate, equal-molar mixtures of potassium acidthallate and sodium hydroxide, disodium hydrogen citrate, and the like.

Small amounts of a strong acid such as hydrochloric acid can be used in conjunction with such buffers to neutralize some hydroxyl ions in addition to those which would be neutralized by the buffer alone. For example, if an aqueous solution is buffered by the presence of equal molar amounts of acetic acid and sodium acetate plus one-tenth molar hydrochloric acid, the amount of hydroxyl ion required to increase the pH to about 7 would be about one-tenth mole more for the hydrochloric acid-containing solution than for the solution free of hydrochloric acid.

Reactive coupounds for gradually increasing the pH of aqueous liquids in accordance with the present invention can comprise substantially any which are water-soluble and react with water, or react in the presence of water, to form water-soluble products that increase the pH of an aqueous solution. Such materials include hydrolyzable amides, such as amides of carbamic acid, urea, the homologs of urea, the salts of cyanic acid, organic acid amides such as formamine, dimethyl formamide, acetamide, and the like. The water-soluble cyanates and the lower organic acid amides, such as, sodium cyanate, formamide, dimethyl formamide, and the like, are preferred.

The reactive compounds for reducing the pH of an aqueous solution in accordance with the present invention can comprise substantially any water-soluble materials which react with water, or react in the presence of water (at a rate significantly slower than that of the pH-increasing increasing reactive compound) to yield hydrogen ions or acidic products that form hydrogen ions in water. Examples of suitable compounds include: water-reactive esters (which are hydrolyzable at moderate temperatures such as 100° to 300° F.) which are water-soluble esters of water-soluble acids, preferably esters of $C_{1-5}$ alcohols of $C_{1-3}$ fatty acids such as methyl formate, methyl acetate, ethyl formate or ethyl acetate, such alcohol esters of phosphoric acid or sulfuric acid, or the like; relatively easily hydrolyzable organic halides of the type described in the Dilgren and Newman U.S. Pat. Nos. 3,215,199; 3,297,090 and 3,307,630, such as the normal or isopropyl chlorides, alkyl chloride, tertiary-butyl chloride, or the like. A lower alcohol ester of a lower fatty acid, such as methyl formate, is particularly suitable.

The compositions and concentrations of the above components of the aqueous liquid systems used in the present invention are preferably arranged in the following manner relative to (a) the time-temperature exposure of fluid flowed into contact with a subterranean earth formation to be treated and (b) the selected extent and duration for a relatively high viscosity in the temporary plugging system. As known to those skilled in the art, the rates at which hydroxyl ions and hydrogen ions are released by the respective pH-increasing and pH-decreasing reactive compounds increase with increases in temperature. The time-temperature exposure of a fluid flowed into a given subterranean reservoir is a function of both the temperature of the reservoir at the flow rate of the fluid moving from a surface location to the reservoir. But, the rate at which it is desirable to flow fluid into a given reservoir is generally limited by the extent of permeability of the reservoir and the amount of pressure which can be applied without damaging the reservoir and/or the conduits within a well. Therefore, the compositons and proportions of the system components are selected so that, with the time-temperature exposure provided by flowing fluid at the desired rate into the reservoir to be plugged, (a) the cellulose ether hydrolyzing and solution-thickening will be substantially completed by the time a slug of the system has reached the formation, and (b) with the solution at the reservoir temperature, the cellulose ether hydrolysis will be delayed long enough to provide the selected duration of plugging without requiring an unduly long subsequent delay in waiting for the viscosity to break.

For example, where the time-temperature exposure of fluid flowing from the surface location to the reservoir will be about 2 hours at temperatures ranging from about 75° to 100° F., a buffering system comprising equal-molar amounts of acetic acid and sodium acetate can be used in a concentration of about 0.5 molar in conjunction with a pH-increasing reactive material comprising sodium cyanate in a concentration of about 1.0 molar. Thus, by about the time the solution reaches the reservoir formation, the buffering action will have been overcome and the pH of the solution will have increased to about 7 or more. This will cause a relative rapid hydration of any remaining unhydrated dispersed hydroxyethylcellulose. In such a system the amount and type of the cellulose ether might comprise about 150 pounds per 1,000 gallons of aqueous liquid of Natrasol 250 HHR. When such an aqueous liquid system is pumped into contact with a subterranean formation, for certain temporary plugging applications, the liquid is preferably kept substantially static during the hydration of the cellulose ether and the development of a high viscosity. For such time-temperature exposure conditions, such a system can advantageously contain a pH-reducing reactive compound comprising methyl formate in a concentration of about 2.5 molar. While the sodium cyanate hydrolysis is occurring, but at a relatively slower rate, the methyl formate is hydrolyzing into methyl alcohol and forming acid. Within a time in the order of 24 hours, the methyl formate hydrolysis will have generated sufficient hydrogen ions to lower the pH of the solution to one which is significantly acidic. This will cause an acid-induced hydrolysis of the hydrated cellulose ether and will cause the viscosity of the cellulose ether-thickened solution to reduce to a relatively low value. The effect of the pH of such a solution on the rate at which such cellulose ethers are hydrolyzed is described and illustrated in the Lybarger, Scheuerman and Karnes U.S. Pat. No. 3,868,996. As known to those skilled in the art, the pH that will be established in a given aqueous solution of buffering agents pH-increasing and pH-reducing reactive compounds can readily be calculated (for example, a pH of about 4 being attained in the above-described solution) and/or can be determinded by simple laboratory tests, such as forming such a mixture and measuring its pH attained after substantially all of the pH-increasing and pH-reducing reactive components have reacted.

What is claimed is:

1. A process for temporarily plugging a subterranean earth formation in or around the borehole of a well, comprising:
    buffering an aqueous solution to retain a pH of from about 2 to 6 while a selected amount of hydroxyl ions are being added to the solution;
    dissolving in the aqueous solution a reactive compound that gradually yields enough hydroxyl ions to overcome the buffering and make the solution at least substantially alkaline;
    dissolving in the aqueous solution a reactive compound that reacts more slowly than the hydroxyl ion-yielding reactant but yields enough hydrogen ions to subsequently make the solution significantly acidic;
    dispersing in the aqueous solution an unhydrated cellulose ether which hydrates relatively slowly in a significantly acidic aqueous liquid, hydrates relatively rapidly in a substantially alkaline aqueous liquid and, when hydrated, dissolves in an aqueous liquid to form a relatively viscous solution;

adjusting the compositions and concentrations of the materials dissolved and dispersed in the aqueous liquid relative to the time-temperature exposure of fluid flowed into contact with the subterranean earth formation and the extent and duration selected for the viscosity of a fluid temporarily plugging the earth formation; and flowing the aqueous liquid into contact with the subterranean earth formation so that the selected extent of viscosity is exhibited for the selected time while the solution is in contact with the subterranean earth formation.

2. The process of claim 1 in which the fluid described is used as a formation fracturing fluid.

3. The process of claim 1 in which the fluid described is used as a temporary diverting fluid in a well treatment.

4. The process of claim 1 in which the fluid described is used as a workover fluid.

5. The process of claim 1 in which the fluid described is used to temporarily plug one permeable formation while another fluid is injected into a second permeable formation both of which are in communication with a well.

6. The process of claim 1 in which the hydroxyl ion-yielding compound is a water-soluble amide.

7. The process of claim 1 in which the hydrogen ion-yielding compound is a water-soluble alcohol ester of a water-soluble acid.

8. The process of claim 1 in which the solution is buffered with equimolar amounts of acetic acid and sodium acetate and the hydroxyl ion-yielding compound is sodium cyanate.

9. The process of claim 8 in which the hydrogen ion-yielding compound is methyl formate.

* * * * *